Dec. 29, 1959      T. G. SCHRADE      2,918,730
CHILD'S BEHAVIOR RECORDING AND INCENTIVE DEVICE
Filed Dec. 15, 1958
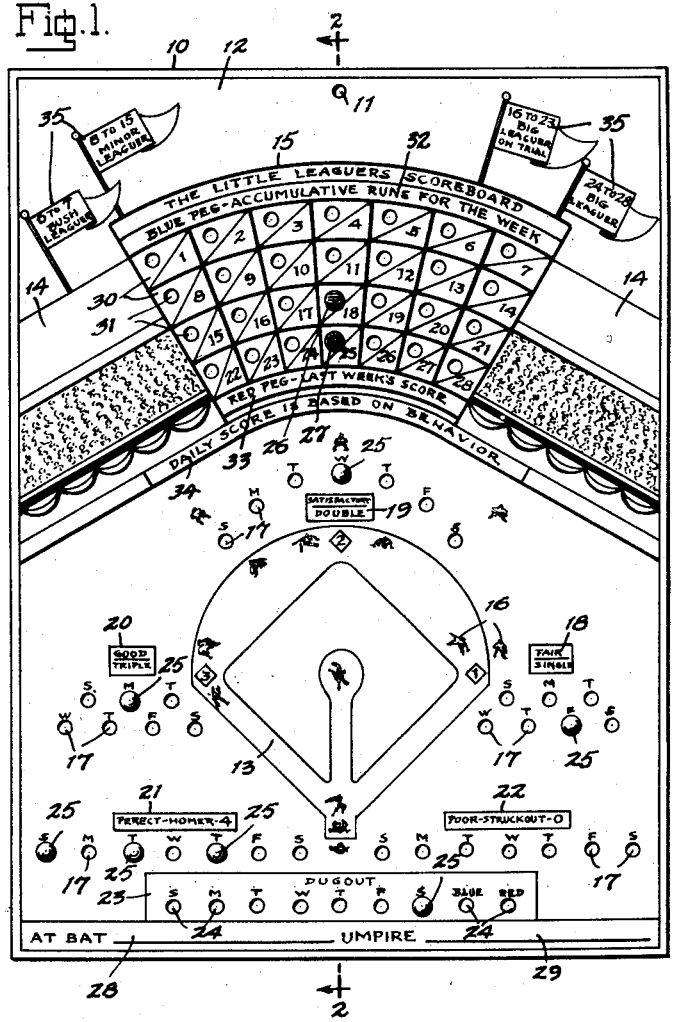
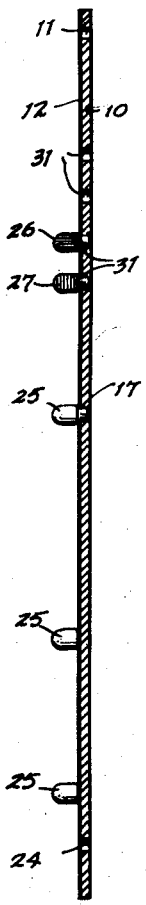
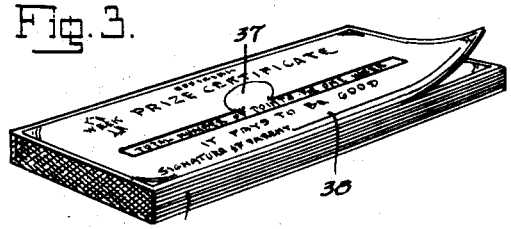
INVENTOR.
THEODORE G. SCHRADE
BY
ATTORNEY.

United States Patent Office 2,918,730
Patented Dec. 29, 1959

2,918,730

CHILD'S BEHAVIOR RECORDING AND INCENTIVE DEVICE

Theodore G. Schrade, Nichols, Conn.

Application December 15, 1958, Serial No. 780,410

3 Claims. (Cl. 35—23)

The present invention relates to a game apparatus, and particularly a behavior recording and incentive apparatus whereby a child's daily behavior may be judged and recorded, and including means whereby an accumulative behavior score over an extended calender period, as for instance, a week, may be recorded in comparable juxtaposition to a previous accumulative score of a previous calender period, for instance, the week preceding the week currently being recorded. Thus the accumulative record presents a constant goal to a child, so thet he will endeavor to improve his daily behavior score toward the attainment of a suitable reward for the maintenance of a high level of good behavior over an extended period.

A further object is to provide a game apparatus including a pictorial representation of competitive activity familiar to the child as, for instance, a base ball game, having progressively arranged stations representing increasing values, and to provide recording means corresponding to the days of a week in relation to each such station, whereby a daily record is made of scores representing levels of behavior based on the respective values of such stations. Thus there is created in the child's mind a competitive behavior incentive, through which the child, in order to obtain a higher daily score, will try to equate his behavior with the attainments of athletes associated with the game depicted upon the apparatus, for instance, well known baseball players.

Other objects and advantages will become apparent from a consideration of the following detailed description taken in connection with the accompanying drawings wherein a satisfactory embodiment of the invention is shown. However it will be understood that the invention is not limited to the details disclosed but includes all such variations and modifications as fall within the spirit of the invention and the scope of the appended claims.

In the drawings:

Fig. 1 is a plan view of a game board according to the invention, showing the position of the score markers, as, for instance, pegs, in cooperative relation therewith;

Fig. 2 is a vertical sectional view taken along the line 2—2 of Fig. 1; and

Fig. 3 is a perspective view of a pad of prize certificates for use in determining an award in accordance with accumulative behavior scores recorded upon the board.

Referring to the drawings, the game apparatus, according to the invention, comprises a rectangular board 10 preferably provided near its upper edge with a hole 11, whereby the board may be hung by means of a suitable hanger upon a wall or the like. Upon the face of the board there is provided a pictorial representation, and this is preferably printed upon a sheet of suitable material 12 pasted to the board.

The pictorial representation in the illustrated example is that of a baseball diamond 13 and a grandstand 14, the grandstand representation extending at each side of a score board representation 15. Players 16 are represented at suitable positions upon the baseball field, and preferably these show a situation in a baseball game where the bases are filled and a batter is about to be pitched to, so that there is pictured the potential situation where a home run will result in the highest possible score of four runs. First, second and third bases and home plate, respectively, represent values of 1, 2, 3 and 4, and in relation to the bases and home plate there are respectively provided score recording areas for recording levels of behavior represented by a single, double, triple or home run hit, and additionally there is provided an area for recording a strike-out, the respective scores being 1, 2, 3, 4 and 0. Each area is provided with a series of seven peg receiving holes 17 respectively designated by the letters S, M, T, W, T, F, S as representing the days of the week. The first base area is designated, as at 18, "Fair-Single"; the second base area is designated, as at 19, "Satisfactory-Double"; the third base area is designated, as at 20, "Good-Triple"; the home plate area is designated, as at 21, "Perfect-Homer-4"; and the strike-out area is designated, as at 22, "Poor-Struck-Out-0."

In an area 23 designated "Dugout" there is provided a series of nine peg receiving holes 24, the first seven of these holes being designated by the letters S, M, T, W, T, F, S as representing the days of the week, the eighth hole being designated by the word "Blue" and the ninth hole being designated by the word "Red." The seven holes are adapted to receive, when they are not in play, the seven pegs 25 which are employed for recording daily scores, as will presently more fully appear, and the eighth and ninth holes are respectively adapted to receive, when they are not in play, pegs 26 and 27 which are employed for recording accumulative scores, and are distinctively colored to differentiate from each other, and also from the pegs 25. The pegs 25 are, for example, white; the peg 26 blue; and the peg 27 red. The blue and red pegs are adapted during the playing of the game to be placed in the accumulative score board 15, as will presently more fully appear. In a space 28 designated "At Bat" the child's name is to be placed, and in a space 29 designated "Umpire" the parent's name is to be placed.

The score board 15 contains a series of spaces 30 corresponding in number to the product of the number of days of the week, namely seven, multiplied by the highest daily score, namely four, the number of spaces therefore being twenty-eight. The spaces are consecutively numbered "1" to "28" and each is provided with a peg receiving hole 31. The score board is provided with suitable legends designating the functions of the blue and red pegs to be placed thereon, for instance "Blue peg—Accumulative runs for the week," as at 32; and "Red peg—Last week's score," as at 33. In relation to the baseball field representation there is preferably a designation "Daily Score Is Based on Behavior," as at 34.

Atop the representation of the grandstand there is provided a series of four pennant representations 35, respectively characterizing the accumulative scores. In the illustrated example the first pennant contains the legend "0-7 Bush Leaguer"; the second pennant contains the legend "8-15 Minor Leaguer"; the third pennant contains the legend "16-23 Big Leaguer on Trial"; and the fourth pennant contains the legend "24-28 Big Leaguer."

Coordinated with the board is a pad or book of prize certificates 36, one certificate to be given to the child at the end of each week, preferably on the basis of the child having made a required minimum accumulative score for the week. The certificate is provided with a space 37 within which the weekly accumulated score may be written and with a space 38 for the signature of the parent awarding the certificate. An award will preferably be given by the parent when the total score represented by the scores recorded upon a series of certificates reaches a previously agreed upon number. Obviously, the award would be something highly desired by the child.

In the operation of the game apparatus of the invention, the board is hung in a prominent spot in a household, preferably in a room which all of the family are likely to frequent, such as the kitchen. Each child in the household will be provided with a separate apparatus, and its name will be placed in the "At Bat" space 28, and the parent's name or names will be placed in the "Umpire" space 29. At a suitable time, preferably after the evening meal, both parents should decide the rating of the child for the day, whether it was perfect, good, satisfactory or poor. Then the child should place a peg 25 in the whole 17 designated for the particular day in the scoring area opposite the agreed upon rating.

As illustrated by the arrangement of the pegs in Fig. 1, the game has progressed through Friday of a week beginning with Sunday, and the red peg 27 has been left in the hole 31 of the accumulative scoreboard 15, designated by the number "25," as indicating the total score made by the child for the previous week. It will be seen that the child made a score of "4" for Sunday, "3" for Monday, "4" for Tuesday, "2" for Wednesday, "4" for Thursday and "1" for Friday, making an accumulated score through Friday of "18." The blue peg 26 indicating the day-to-day accumulated score is therefore placed in the hole 31 designated by the number "18," having previously been placed at the end of each day during the week in the proper hole indicating the accumulated score up to the end of such day. During the week the child has had the goal of "25" for the previous week in view, either to equal or surpass, and by a comparison in the positions of the "Blue" and "Red" pegs he has known from day-to-day just what score would be necessary for this purpose. While in the illustrated example he cannot equal for the current week the score of "25" made in the previous week he can, by obtaining a perfect score of "4" for Saturday, bring the total accumulated score for the week up to "22." Thus, the juxtaposition of the blue and red pegs presents a constant incentive for the child to maintain a high level of behavior.

At the end of a week the blue peg 26 is placed in the hole indicated "Blue" in the "Dugout" area 23, and at the same time all of the white pegs 25 are placed in the holes 24 indicated with the days of the week, the board thus being ready for play for the following week. The red peg 27 is placed in the proper hole of the accumulative scoreboard to indicate the total of the week, where it remains during the following week as an incentive reminder. If the child has obtained an agreed upon minimum score for the week to qualify him to receive a prize certificate, one of the certificates 36 is given to him, filled out with the amount of the score for the week, and signed by the parent. When the child has accumulated a sufficient number of certificates having a total value of an agreed upon number, he can be rewarded with an agreed upon prize.

While the illustrated example shows a pictorial representation of a baseball game, which would be especially suitable for boys, it will be understood that the game apparatus of the invention contemplates pictorial representations of other games and activties which have particular appeal to either boys or girls. As an example of an activity appealing to girls, the pictorial representation may be that of a stage setup for conducting a Little Miss America Contest, with the several stations having progressively increasing values representing various levels leading up to a winner of such contest, these values being scored according to the behavior of the child. Such stations may, for instance, be designated with such legends as "Runner Up," "Young Miss City," "Young Miss State," "Young Miss America," and "Disqualified."

It is also pointed out that instead of the markers being in the form of pegs engaged in holes, other suitable marking means may be employed.

What is claimed is:

1. A game apparatus of the character described, comprising a game board, a pictorial representation on said game board of an activity having a plurality of levels of performance represented by spaced stations, designations associated with said stations identifying said levels of performance by a score value, a plurality of score marker receiving spaces associated with each of said stations and representing days of a given calendar period, each of said spaces having a peg receiving hole, a pictorial representation on said game board of an accumulative score board having a plurality of score marker receiving spaces of a number corresponding to the product of the number of said stations multiplied by the number of days of said given calendar period, each of said last mentioned spaces having a peg receiving hole, designations associated with said spaces respectively identifying them by score values representing a sequential accumulation of the score values associated with said stations throughout said given calendar period, a plurality of marker playing pegs movable on said game board and corresponding in number to the number of days of said given calendar period adapted for selective insertion in the holes of said score marker receiving spaces associated with said stations, and a pair of marker playing pegs adapted for selective insertion in the holes of said score marker receiving spaces of said score board to respectively indicate a current accumulative score during said given calendar period and a total accumulative score for a previous calendar period.

2. The game apparatus as defined in claim 1, further characterized by an area of said game board having a plurality of peg receiving holes for respectively receiving all of said pegs when not in play.

3. The game apparatus as defined in claim 1, further characterized by a plurality of prize certificates each having a space for recording an accumulative total score for said given calendar period, and each having a space for receiving a validating signature.

References Cited in the file of this patent

UNITED STATES PATENTS

| | | |
|---|---|---|
| 1,042,142 | Pohlig | Oct. 22, 1912 |
| 2,086,267 | Holmblad | July 6, 1937 |
| 2,340,139 | Norford | Jan. 25, 1944 |
| 2,414,614 | Shurick | Jan. 21, 1947 |
| 2,512,485 | Cougias | June 20, 1950 |